United States Patent [19]

Sherby

[11] Patent Number: 4,495,845
[45] Date of Patent: Jan. 29, 1985

[54] PATTERN CUTTER

[75] Inventor: James E. Sherby, Wilkinsburg, Pa.

[73] Assignee: PPG Industries, Inc., Pittsburgh, Pa.

[21] Appl. No.: 279,495

[22] Filed: Jul. 1, 1981

[51] Int. Cl.$^3$ .............................................. B26D 3/08
[52] U.S. Cl. ...................................... 83/886; 83/410;
83/565; 83/925 CC; 409/125
[58] Field of Search .................... 83/71, 410, 413, 884,
83/886, 565, 916, 925 CC; 409/97, 107, 109,
110, 125, 126, 130, 115; 33/23 C, 23 K, 23 H

[56] References Cited

U.S. PATENT DOCUMENTS

| | | | |
|---|---|---|---|
| 2,774,131 | 12/1956 | Crane | 83/410 |
| 3,144,798 | 8/1964 | Leibinger | 83/916 |
| 3,537,345 | 11/1970 | Luppino | 83/12 |
| 3,772,949 | 11/1973 | Pavone et al. | 83/71 X |
| 3,939,742 | 2/1976 | Jung | 83/565 X |
| 4,047,457 | 9/1977 | Stubbins | 83/925 CC |
| 4,171,657 | 10/1979 | Halberschmidt et al. | 83/886 |

Primary Examiner—William R. Briggs
Attorney, Agent, or Firm—Donald Carl Lepiane; Robert A. Westerlund, Jr.; William D. West

[57] ABSTRACT

Reverse contour changes, e.g., changes from a convex peripheral portion to concave peripheral portion are scored in a glass sheet by moving the glass sheet along an X-Y axes while pivoting a scoring wheel housing about an axis transverse to the first and second axes so as to positively rotate the housing in response to contour changes.

Further, a pattern cutter includes a sheet support which is mounted for movement along X and Y axes and about a pivoting Z axis relative to a stationary scoring wheel so as to positively control the scoring of the glass sheet during changes from convex portions to concave portions.

12 Claims, 4 Drawing Figures

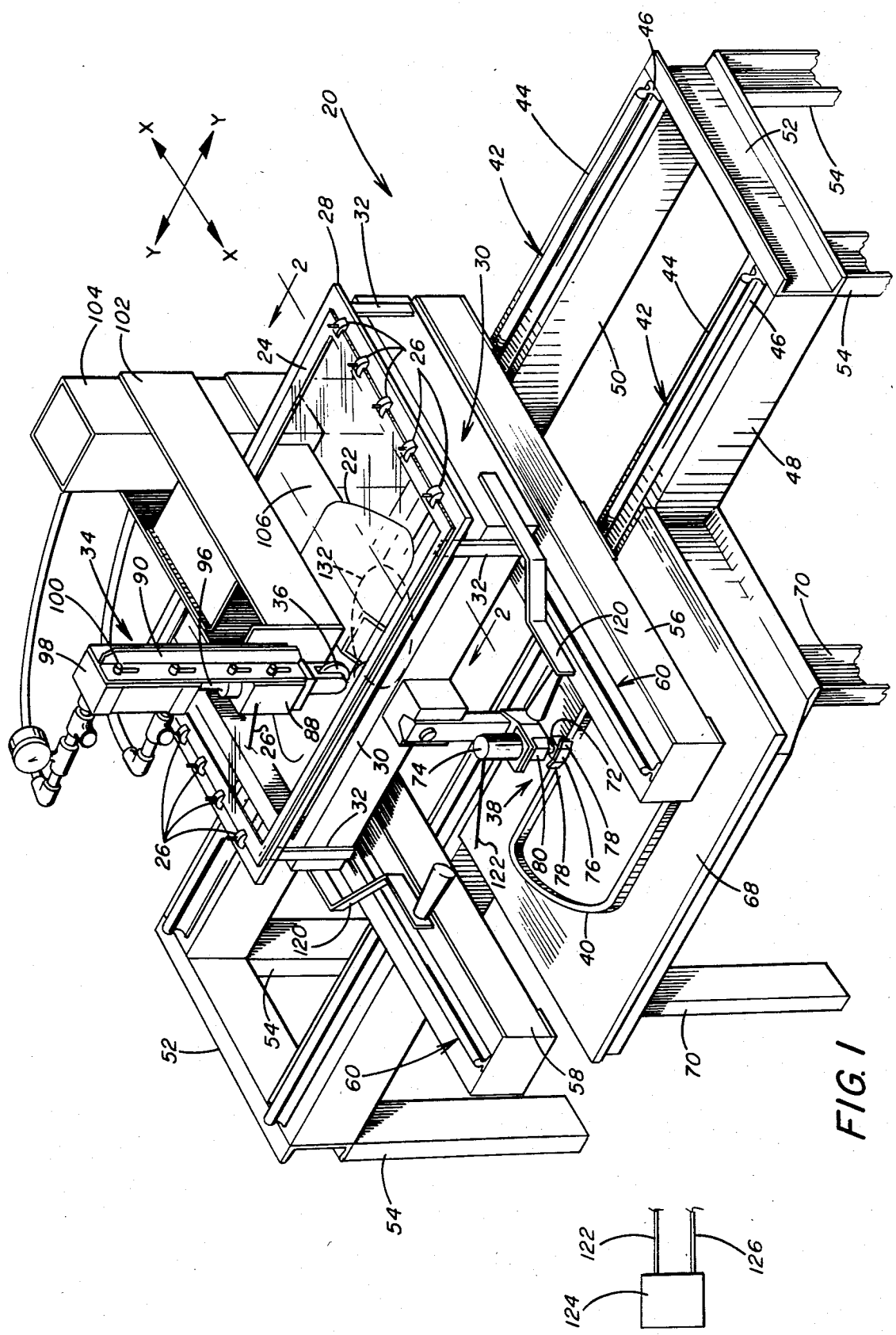

PATTERN CUTTER

BACKGROUND OF THE INVENTION

This invention relates to an apparatus for and method of scoring patterns in refractory sheets and, more particularly, to scoring automotive and aircraft window blanks in glass sheets.

DISCUSSION OF THE PRESENTLY AVAILABLE TECHNIQUES

In general, apparatus for scoring patterns, e.g., an automotive window blank in a glass sheet, include a scoring device mounted for movement relative to one another along X and Y axes. There are various techniques for controlling displacement of the scoring device along the axes. For example, U.S. Pat. No. 4,171,657 teaches the use of a computer for selectively energizing motors to drive a first bridge along the X axis and a second bridge along the Y axis with a scoring device responsive to the movement of the bridges. U.S. Pat. No. 3,537,345 teaches a scoring device having a vertically extending shaft riding on the inner surface of a cam defining the outline of the blank to be scored within the sheet. Another available technique includes a cam follower riding on the outer surface of a cam having an outline similar to the outline of the blank. The cam follower selectively moves a bridge on its respective axes which, in turn, moves a scoring device to score the outline of a blank in a glass sheet.

Although each of the above available pattern scoring apparatus is acceptable, there are limitations. For example, the scoring device usually includes a scoring wheel freely rotatable on a wheel shaft mounted in a housing. The housing is secured on a piston which urges the scoring wheel against the glass sheet under a scoring force. The longitudinal axis of the wheel shaft is normal to and offset from the longitudinal axis of the piston. With this arrangement, as the scoring wheel moves along a nonlinear score path, the scoring wheel casters. Since the score wheel is free to caster, closely adjacent reverse arcuate patterns are difficult to score in glass sheets. As used herein and discussed in more detail below, a reverse arcuate pattern has a concave or convex peripheral portion that changes into a convex or concave peripheral portion, respectively.

It would be advantageous to provide a method of an apparatus for scoring blanks within sheets that does not have the limitations of the presently available pattern cutting or scoring apparatus.

SUMMARY OF THE INVENTION

This invention relates to an apparatus for generating a pattern in an article, e.g., scoring an automotive window blank in a glass sheet, and includes an article support mounted for movement along a first path transverse to a second path. Article marking facilities, e.g., a scoring wheel, is mounted for rotation about an axis generally transverse to the first and second paths and is positioned relative to the paths. Facilities defining the configuration of the pattern, e.g., a template, is provided along with facilities responsive to the outline of the template to act on the scoring wheel to rotate the scoring wheel about its axis in response to contour changes of the template.

This invention further relates to an apparatus for generating a pattern in an article that includes an article support mounted for movement along a first reciprocating linear path, a second reciprocating linear path transverse to the first reciprocating linear path and a rotating axis generally transverse to the first and second paths. Article marking facilities is mounted relative to the first and second paths and the rotating axes. The article support moves in response to the defining facilities e.g., a computer, so as to move the article, e.g., a glass sheet, along the first path and/or second path and/or pivot axis to score a pattern in the glass sheet.

Further this invention relates to a method of scoring a glass sheet which includes the steps of engaging the glass sheet with scoring facilities and thereafter selectively moving the sheet along a first axis and/or along a second axis normal to the first axis and/or about a rotating axis normal to the first and second axes.

Still further, this invention relates to a method of scoring a glass sheet which includes engaging a glass sheet with scoring facilities and thereafter selectively moving the sheet along a first axis normal to a second axis and the scoring facilities about a pivot axis generally transverse to the first and second scoring axes to score a pattern in the sheet.

BRIEF DESCRIPTION OF THE DRAWING

FIG. 1 is an isometric view of a pattern cutter incorporating features of the invention for positively rotating a scoring wheel housing in response to movement of a template follower;

DESCRIPTION OF THE INVENTION

Figure 2:
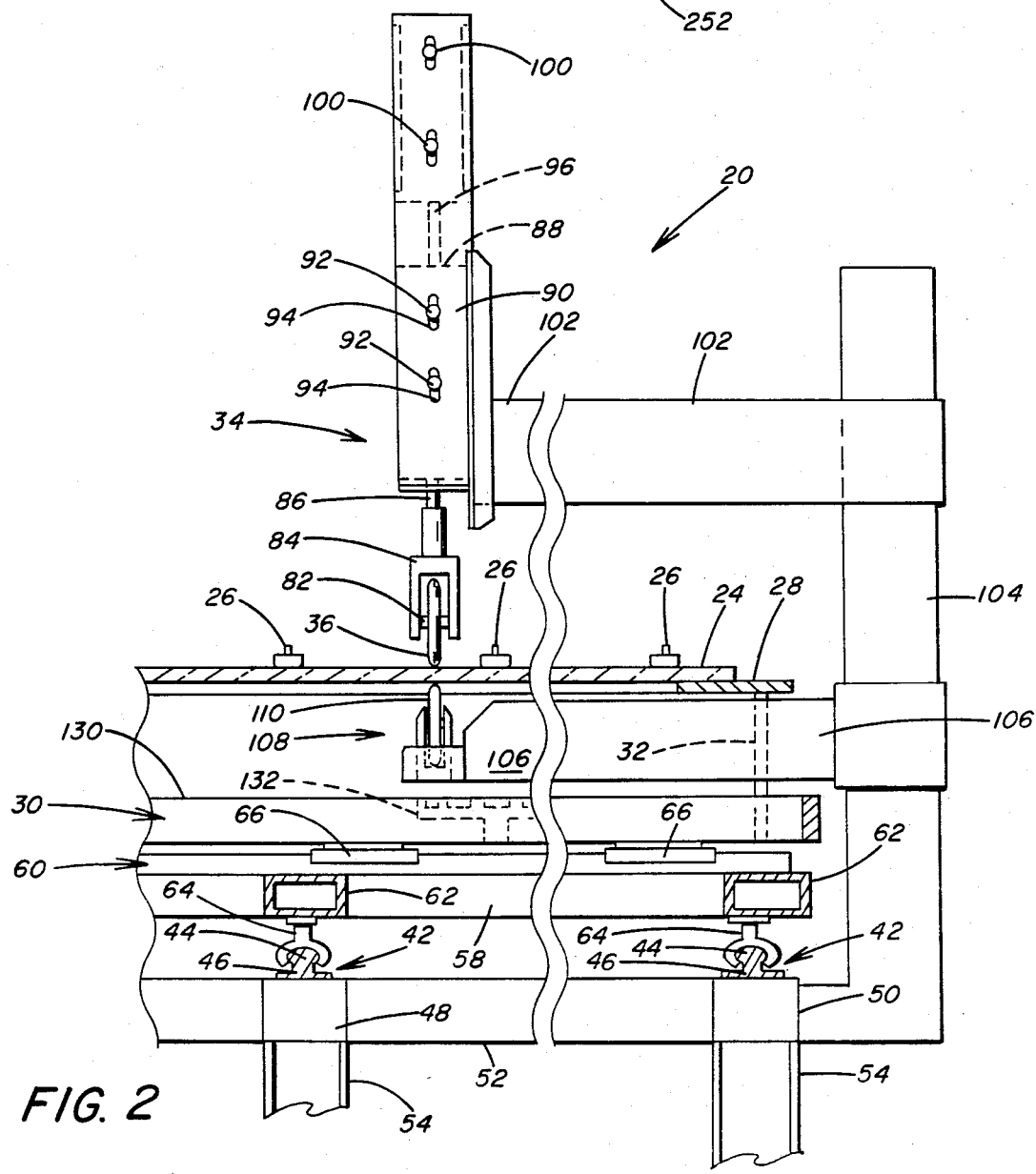
FIG. 2 is a fragmented sectional view taken along line 2—2 of FIG. 1.

Shown in FIGS. 1 and 2 is a pattern cutter or scorer 20 incorporating features of the invention for scoring a pattern 22 in a sheet 24. In the discussion of the invention, the sheet 24 is a glass sheet and the pattern 22 scored therein is an automotive or aircraft window blank; however, as will be appreciated, the invention is not limited to the material of the sheet 24, the outline of the pattern 22 nor subsequent use of the pattern. For example, the invention may be practiced on metal sheets, wooden sheets, or sheets of a refractory material, such as glass, glassceramics or ceramics. In general, the glass sheet 24 is conveniently secured, e.g., by spring biased clamps 26 on outline support 28 which in turn is supported above table 30 by vertical struts 32. The table 30 is conveniently mounted for displacement relative to a scoring device 34 along a first axis, e.g., X axis, which is transverse to a second axis, e.g., normal to a Y axis. During displacement of the glass sheet 24 along the X-Y axes, in a manner to be discussed below, orientation of scoring wheel 36 relative to the glass sheet 24 is controlled in a manner to be discussed below in response to the movement of template follower 38 as it moves along the outer periphery of template 40.

The manner of mounting the table 30 for movement along the X-Y axes is not limiting to the invention, and any convenient technique may be used. For example, a rail 42 defining the Y-axis made of a Thompson Shaft 44 mounted on a support 46 is secured on each of a first pair of elongated members 48 and 50 spaced from one another by a spacing member 52 and elevated by vertical posts 54. A second pair of elongated members 56 and 58 each having a rail 60 define the X axis and are constructed in a similar manner as the rail 42. The members 56 and 58 are spaced from one another by spacing members 62 (shown only in FIG. 2) and conveniently mounted on the rails 42 e.g., by a pair of spaced Thompson linear ball bushings 64 mounted on each of the elongated members 56 and 58 (FIG. 2 shows one pair of spaced bushings 64) for reciprocal movement along the Y axis.

The table 30 includes a pair of bushings 66 mounted on each of a pair of opposed sides and riding on each of the rails 60 secured to the elongated members 56 and 58. FIG. 2 shows a pair of bushings 66, similar to the bushings 64, riding on the rail 60.

Template 40 (see FIG. 1) having the outline to be scored in the glass sheet 24 is conveniently secured on support 68 mounted on standards 70 and the elongated member 48. The cam follower 38 secured on shaft 72 of a rotary encoder 74 has a center planar surfce portion 76 riding on outer periphery surface of the template 40 and outer offset planar surface portions 78. With this arrangement the center planar portion is responsive to changes in the peripheral contour of the template 40, e.g., from linear to nonlinear or vice versa to rotate the encoder shaft 78 which conveniently rotates the scoring wheel 36 in a manner to be discussed. The encoder 74 is mounted for movement along the X or Y axes in any convenient manner. For example, and as shown in FIG. 1, the encoder 74 is mounted on a ledge 80 throughwhich the encoder shaft 72 freely passes. The ledge 80 is part of elevator mechanism 82 conveniently secured to the table 30.

The scoring device 34 includes the scoring wheel 36 rotatably mounted on a shaft 82 (see FIG. 2) secured within bifurcated member 84. The member 84 is mounted on shaft 86 of stepping motor 88 which is slideably mounted in any convenient manner on plate 90 e.g., by headed studs 92, passing through slots 94 formed in the plate 90. Scoring pressure is applied to the stepping motor 90 by piston 96 of air cylinder 98 conveniently secured to the plate 90, e.g., by bolts 100. The plate 90 is conveniently secured to horizontal arm 102 secured to vertical post 104 which, in turn, is secured to elongated member 50, as shown in FIG. 2. A second horizontal arm 106 is secured on the vertical post 104 to support land assembly 108 having a rotatably mounted wheel 110 in spaced alignment with the scoring wheel 36. As will be come apparent, the invention is not limited to the configuration of the scoring wheel or land wheel and any of the types used in the art, for example, as taught in U.S. Pat. Nos. 4,102,277; 3,865,673; and 4,057,184; which teachings hereby incorporated by reference may be used in the practice of the invention. By way of illustration, a glass sheet having a thickness of about ⅜ inch (0.95 centimeter) was scored using a scoring wheel having a diameter of about 5 inches (12.7 centimeters) and a peripheral scoring radius of about 0.005 inch (0.127 millimeter). The scoring wheel was urged against the glass sheet under a load of about 400 pounds (90.8 kilograms). The land wheel used had a diameter of about 5 inches (12.7 centimeters) and a peripheral supporting rim having a width of about ⅛ inch (0.318 centimeter).

In the practice of the invention, the glass sheet 24 is clamped on the sheet support 28 between the land wheel 110 and the scoring wheel 36. The scoring wheel 36 is urged against the glass sheet by the cylinder 98 to pinch portions of the sheet between the land wheel 110 and scoring wheel 36. Handles 120 are used to urge the central portion 76 of the cam 38 against and along the peripheral surface portions of the template 40. When the cam moves along a change in the contour of the template periphery, the encoder shaft 80 rotates which changes the value of output signal forward along cable 122 from the encoder 74 to motor controller 124. The motor controller 124 acts on the signal and forwards a signal along cable 126 to the stepping motor 88 to rotate the scoring wheel 36 to correspond to the contour of the template periphery as sensed by the cam follower.

The pattern scorer may be used to score a glass sheet without a supporting land wheel by removing the arm member 106 and the outline support 28. The glass sheet in this instance is secured on upper surface 130 of the table 30 by vacuum chuck 132 shown better in FIG. 2.

Figure 3:
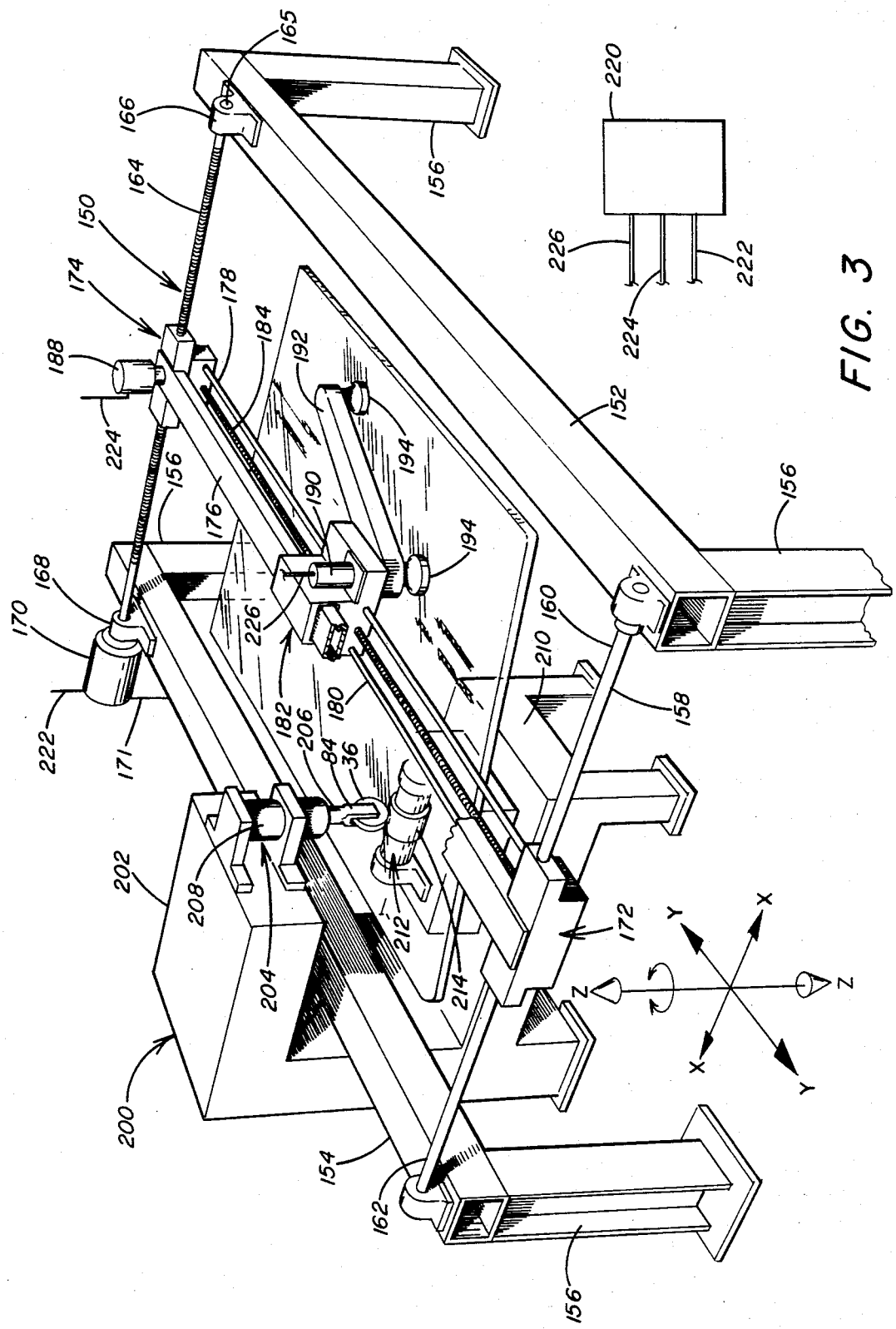
FIG. 3 is an isometric view of a pattern cutter incorporating features of the invention for moving a glass sheet along linear X and Y axes while pivoting about a Z axis.

With reference to FIG. 3, there is shown pattern cutter 150 incorporating features of the invention, including a pair of elongated members 152 and 154 supported by vertical struts 156. A guide rod 158, e.g., a Thompson shaft, has its ends 160 and 162 conveniently secured adjacent an end of the members 152 and 154, respectively. Spaced from the guide rod 158, adjacent the opposite end of the members 152 and 154 is a drive, for example, a threaded bar 164 having end 165 mounted in bearing block 166 on the member 152 with the other end of the bar 164 passing through bearing block 168 and connected to motor 170 secured to the member 154 by plate 171. The bar 164 and guide rail 158 define an axis, for example, the X axis.

Housing 172 having a bearing (not shown) slideably mounted on the guide rail 158 and housing 174 threadably mounted on the shaft 164 are interconnected by strut 176. In this manner rotating the shaft 164 by the motor 170 moves the housing 174 which simultaneously moves the housing 172 along the X axis. A pair of spaced guide rods 178 and 180, e.g., Thompson shafts, have their ends secured to the housing 172 and 174 to define an axis, for example, a Y axis normal to the X axis. A carriage 182 having bearings (not shown) is slideably mounted on the guide rod 178 and 180 and strut 176. The carriage 182 is powered along the Y axis by a worm gear 184 mounted between the housings 172 and 174. The worm gear 184 in turn is rotated by motor 188 mounted on the housing 172.

Mounted on the carriage 182 is a motor 190 having its shaft (not shown) connected to glass retainer, for example, an end of an elongated member 192 having spaced suction cups 194. The motor shaft defines a pivot or rotating axis transverse to the X and Y axes, for example, a Z axis normal to the X and Y axes.

A stand 200 has a cantilevered member 202 over the elongated member 154 for supporting a scoring device 204 which may include the scoring wheel 36 rotatably mounted in member 84 mounted to end of piston 206 of cylinder 208. Mounted below the scoring device 204 is a table 210 supporting a rotatably mounted cylindrical member 212 having a land portion 214. In the practice of the invention, the glass sheet 24 is held in position by the suction cups 194. A controller 220, e.g., a computer, forwards command signals along cable 222 to control the motor 170 to move the glass sheet along the X axis; along cable 224 to control the motor 188 to move the glass sheet along the Y axis and along cable 226 to control the motor 190 to rotate the glass sheet around the Z axis. In this manner, the glass sheet is moved relative to the stationary scoring device 204 to score a blank of a desired contour in the sheet.

Figure 4:
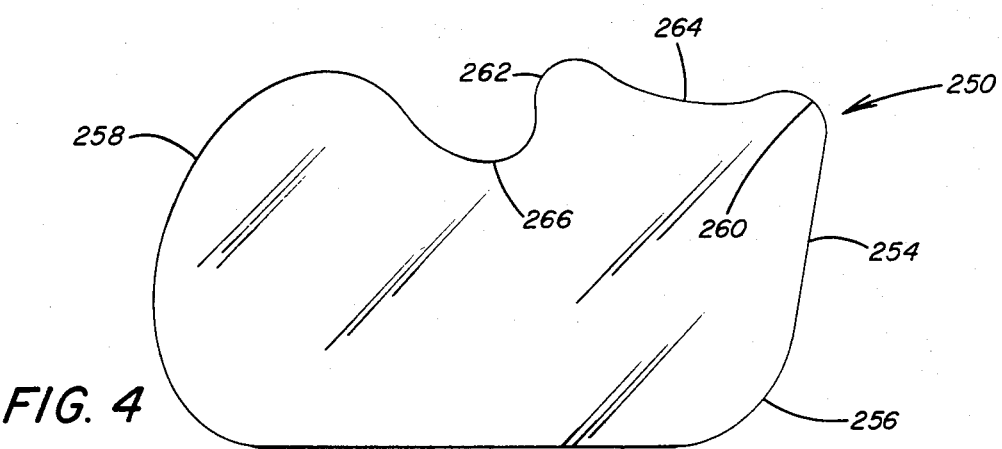
FIG. 4 is an elevated frontal view of a pattern that may be scored within a glass sheet in accordance with the teachings of the invention.

The pattern cutters or scorers of the instant invention are used to score a pattern having linear peripheral portions, and nonlinear peripheral portions, e.g., concave peripheral portions and convex peripheral portions and/or to score reverse arcuate peripheral portions. For example, and with reference to FIG. 4, there is shown a blank 250 that may be cut from a glass sheet using the pattern cutter 20 (FIGS. 1 and 2) or pattern cutter 150 (FIG. 3). The blank 250 includes linear peripheral portions 252 and 254, convex peripheral portions 256, 258, 260 and 262 and concave peripheral portions 264 and 266. The concave peripheral portion 266 and the adjacent convex peripheral portions 258 and 262, and the convex peripheral portion 262 and the adjacent concave peripheral portions 262 and 260 form a pair of reverse arcuate peripheral portions.

Reverse arcuate peripheral portions are scored with ease practicing the instant invention because of positive rotation of the piston shaft to positively rotate the scoring wheel of the scorer 20 (FIGS. 1 and 2) and positive rotation of the glass sheet about the Z axis for the scorer 150 (FIG. 3). In the instance where the scoring wheel is freely rotatable about the piston shaft relative to a glass sheet moving only in the X-Y axes, the change from a concave portion to a convex portion or vice versa depends on the ability of the wheel to change directions by castering. The castering of a wheel to change directions requires a distance of travel depending on its offset, e.g., the distance between the center of wheel rotation to the center of piston rotation. As the offset increases, the distance for transition from a concave position to a convex position increases and vice versa. By practicing the instant invention, the transition can be made immediately and identical patterns of complicated peripheral configurations can be repeatably scored in glass sheets.

As can be appreciated, the invention is not limited to the above discussed examples which were presented for illustration purposes only, more particularly, the scoring device 34 (FIGS. 1 and 2) may be used in place of the scoring device 204 (FIG. 3). Further, the encoder 74 shown in FIG. 1 can be replaced with the computer program to rotate the scoring wheel 36. Further, the invention is not limited to the size of the template relative to the actual size of the blank scored in the sheet. For example, the template may be larger or smaller than the actual blank scored in the sheet and differences in size compensated by adjusted the signal generated from the encoder or the signal received by the stepping motor of the scoring wheel.

What is claimed is:

1. An apparatus for generating a pattern in a work piece, comprising:
   (a) means for supporting said work piece;
   (b) disc marking means for marking said work piece;
   (c) three-dimensional pattern defining means having peripheral edge portions corresponding to the edge configuration of the pattern to be generated in said workpiece;
   (d) means for providing relative movement between said marking means and said supporting means along a first reciprocating path and a second reciprocating path transverse to said first path; and
   (e) means responsive to said peripheral edge portions of said pattern defining means and acting on said marking means and said providing relative movement means including means to rotate said marking means about an axis transverse to said first and said second paths and means to move said providing relative movement means along said first and said second paths to generate said pattern in said workpiece to be supported on said supporting means.

2. The apparatus as set forth in claim 1, wherein said providing relative movement means includes a first carriage supporting said supporting means and movable along said first reciprocating path, and a second carriage supporting said first movable carriage and movable along said second reciprocating path.

3. The apparatus as set forth in claim 2, wherein said means responsive to said pattern defining means includes:
   (a) a cam follower for sensing said peripheral edge portion of said three-dimensional pattern defining means;
   (b) an electric motor;
   (c) means for operatively connecting said cam follower to one of said first or said second carriages for moving said one of said carriages along its respective first or second reciprocating path corresponding to the contour of said peripheral edge portion sensed by said cam follower; and
   (d) means for connecting said electric motor to said cam follower and to said marking means for rotating said marking means about its axis transverse to said first and said second paths corresponding to the contour of said peripheral edge portion sensed by said cam follower.

4. The apparatus as set forth in claim 3, wherein said means responsive to said pattern defining means further includes;
   (a) an encoder;
   (b) means for interconnecting said cam follower and said encoder to generate an encoder signal corresponding to changes in the contour of said peripheral edge portion of said three-dimensional pattern defining means;
   (c) means for relaying said encoder signal to said electric motor; and
   (d) means responsive to said encoder signal for rotating said marking means corresponding to changes in the contour of said peripheral edge portion of said three-dimensional pattern defining means.

5. The apparatus as set forth in claim 4, wherein said cam follower includes a center planar surface portion and side planar surface portions provided on each side of said center portion and offset therefrom.

6. The apparatus as set forth in claim 5, wherein said pattern defining means is a template having an edged periphery.

7. The apparatus of claim 1, wherein said pattern defining means further includes a programmed computer.

8. The apparatus as set forth in claim 6, wherein said disc marking means includes:
   (a) a scoring wheel;
   (b) means for mounting said scoring wheel for rotation about an axis generally parallel to said first and said second reciprocating paths.

9. The apparatus as set forth in claim 8, wherein it further includes means for applying a scoring force to said scoring wheel, for scoring said workpiece.

10. The apparatus as set forth in claim 9, wherein it further includes a land support disposed in spaced, opposed relation to said scoring wheel, for applying a resistive force against said scoring force to said workpiece interposed therebetween.

11. The apparatus as set forth in claim 10, wherein said workpiece is a sheet of refractory material.

12. The apparatus as set forth in claim 11, wherein said refractory sheet is a glass sheet and the pattern scored in said sheet is a vehicle window blank.

* * * * *